Figure 1:
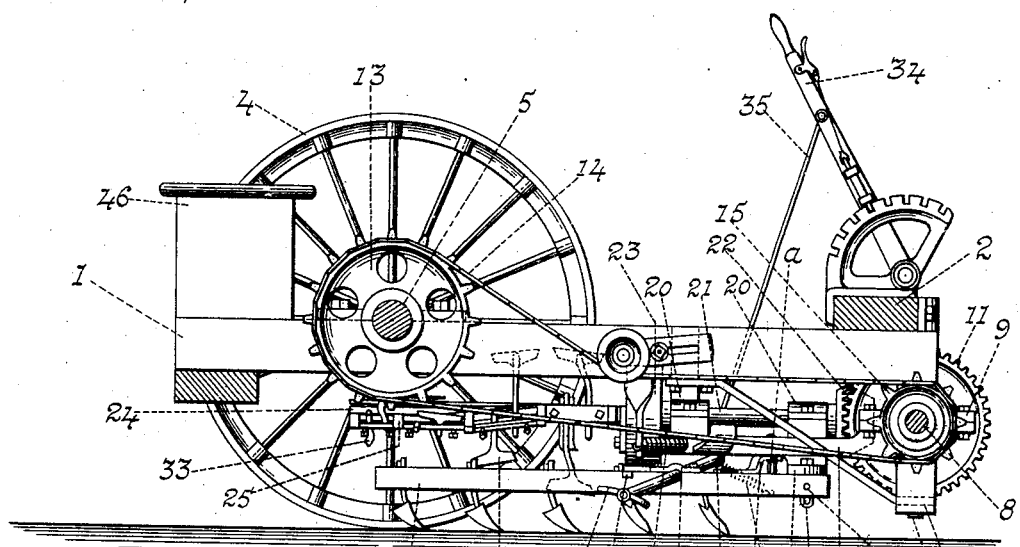

No. 784,911. PATENTED MAR. 14, 1905.
E. J. YOUNG.
BEET BLOCKING MACHINE.
APPLICATION FILED AUG. 8, 1904.

4 SHEETS—SHEET 1.

Witnesses:
Cicero J. Warne
Harry D. Benham

Inventor:
Ernest John Young
By Frank R. Rathbun
Attorney.

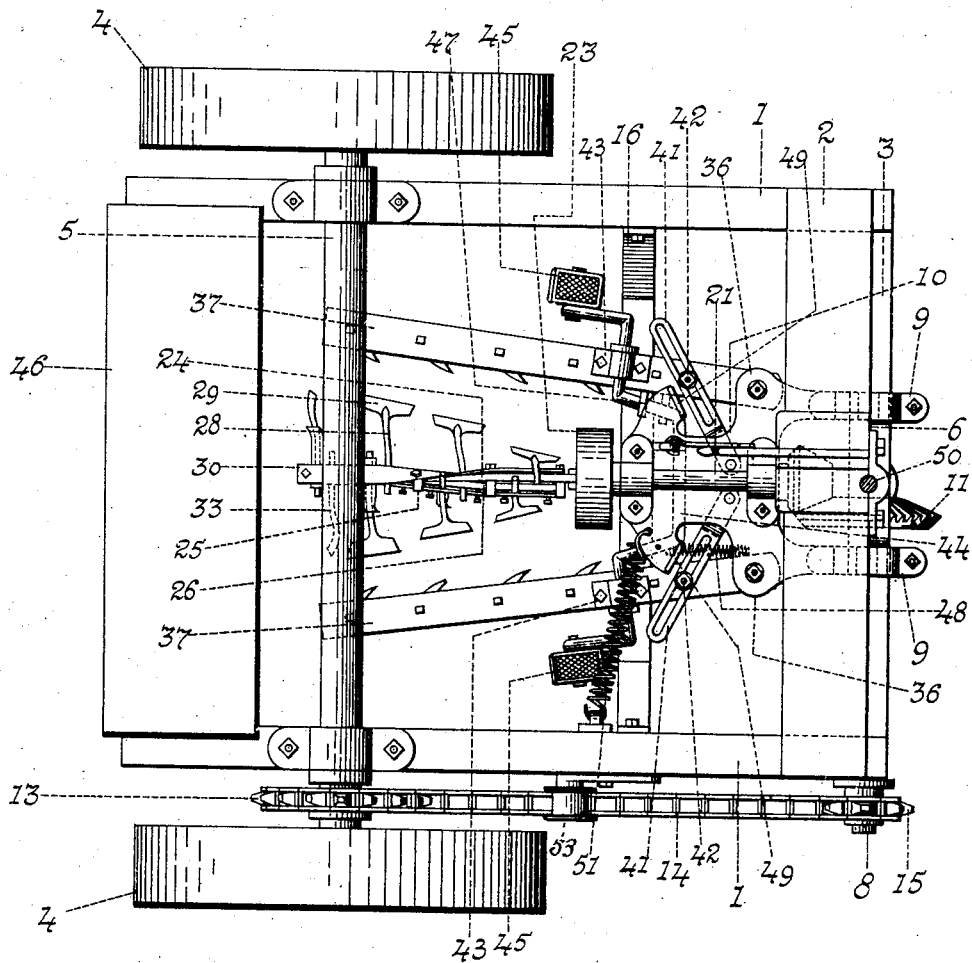

No. 784,911. PATENTED MAR. 14, 1905.
E. J. YOUNG.
BEET BLOCKING MACHINE.
APPLICATION FILED AUG. 8, 1904.
4 SHEETS—SHEET 3.
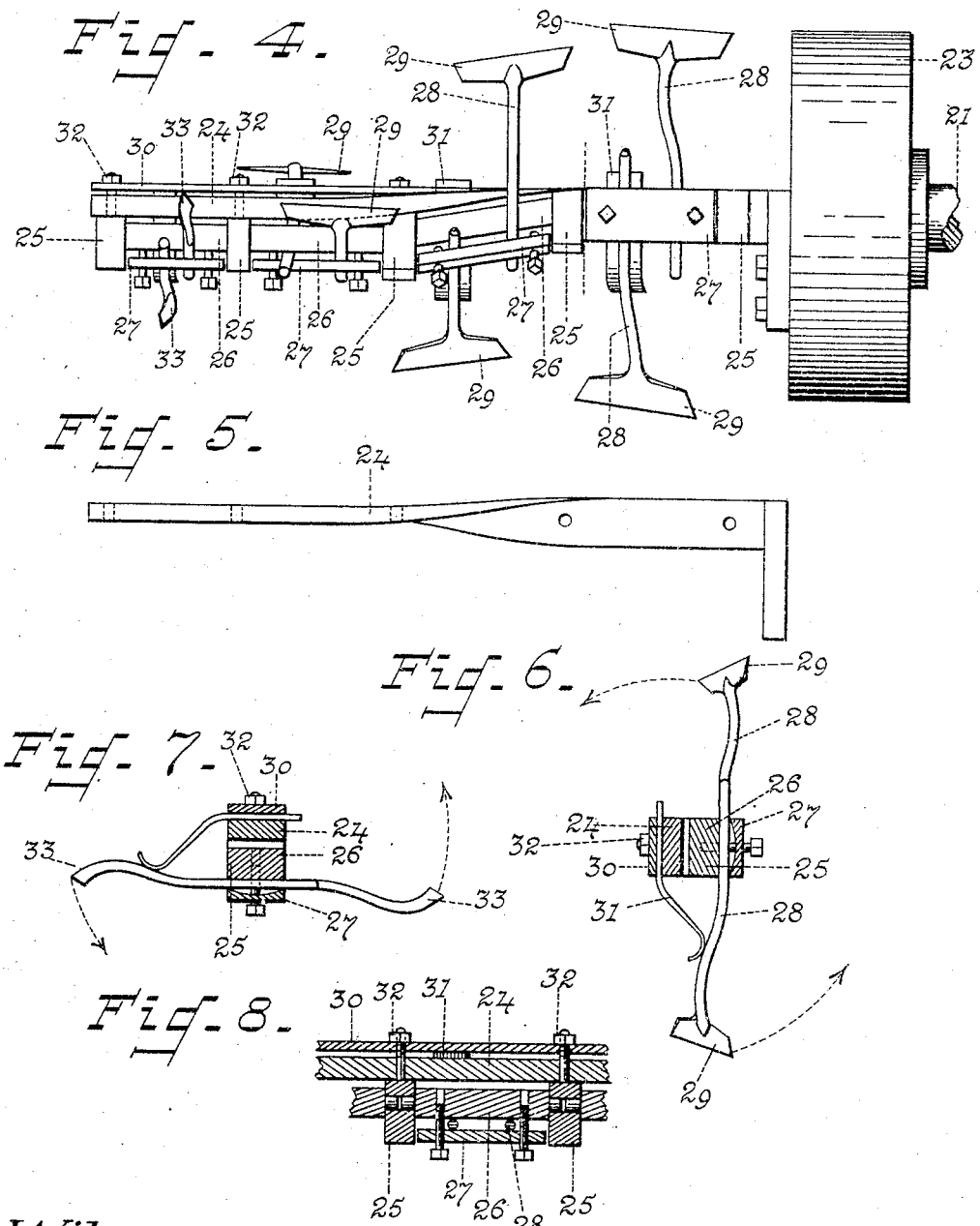
Witnesses:
Cicero J. Warne
Harry D. Binham
Inventor:
Ernest John Young
By Frank R. Rathbun
Attorney.

No. 784,911. PATENTED MAR. 14, 1905.
E. J. YOUNG.
BEET BLOCKING MACHINE.
APPLICATION FILED AUG. 8, 1904.

4 SHEETS—SHEET 4.

Witnesses:
Cicero J. Warne
Harry D. Benham

Inventor:
Ernest John Young,
By Frank R. Rathbun
Attorney.

No. 784,911.    Patented March 14, 1905.

UNITED STATES PATENT OFFICE.

ERNEST JOHN YOUNG, OF FLEMING, NEW YORK.

BEET-BLOCKING MACHINE.

SPECIFICATION forming part of Letters Patent No. 784,911, dated March 14, 1905.

Application filed August 8, 1904. Serial No. 219,966.

*To all whom it may concern:*

Be it known that I, ERNEST JOHN YOUNG, a citizen of the United States of America, residing at Fleming, in the county of Cayuga and State of New York, have invented a new and useful Beet-Blocking Machine, of which the following is a specification.

My invention relates to improvements in beet-blocking machines in which rotating blocking blades or cutters remove the superfluous growth in the rows of the young beets at desired intervals while leaving a portion of the same to mature as the machine carrying said blocking blades or cutters and their connected parts is drawn over the rows of beets; and the objects of my improvements are, first, to provide means whereby the said blocking blades or cutters may be given a horizontal swing or motion and also a vertical motion during the process of blocking, both of the said motions being effected by and under the control of the feet of the driver in his seat on the machine, and, second, to provide means in the machine for the cultivation of the growth that is left at the time that the process of blocking is performed when so desired. I attain these objects by the mechanism illustrated in the drawings, in which—

Figure 2:
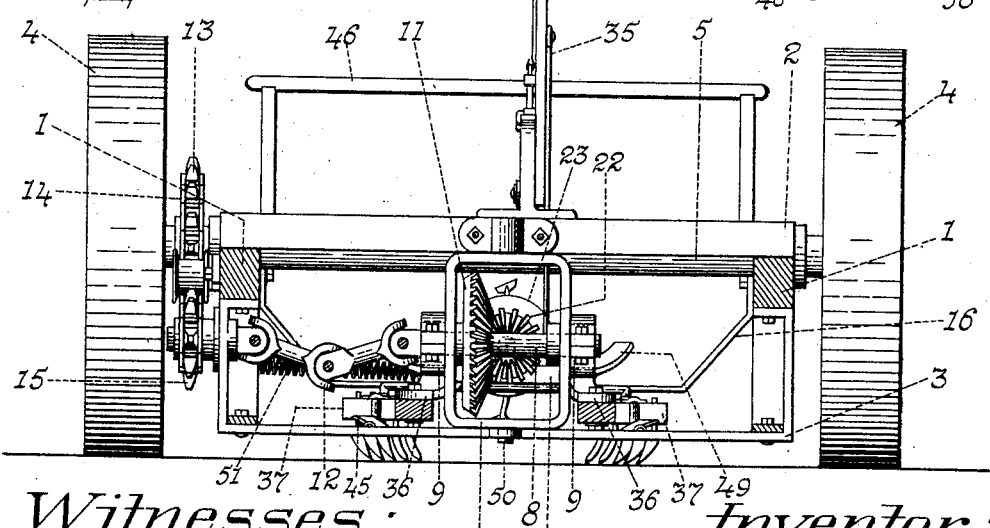
Figure 9:
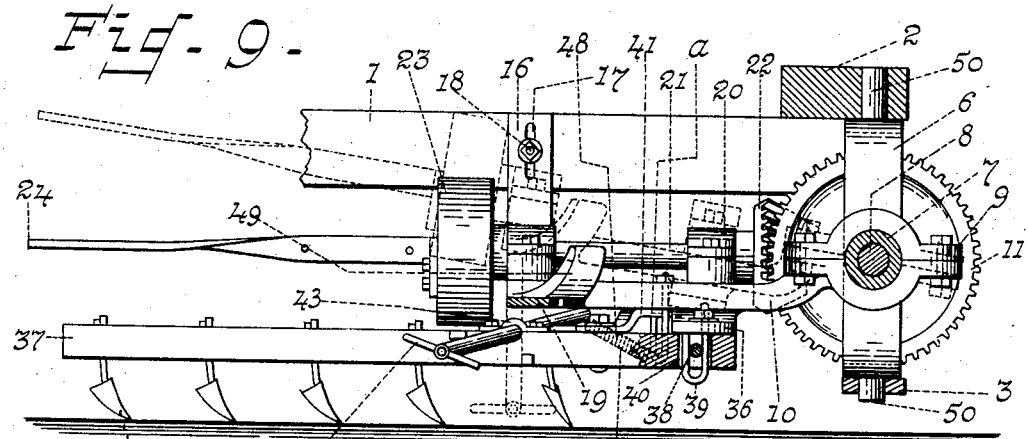

Figure 1 is a side elevation of the machine, the road-wheel next the point of view being omitted, so as not to obstruct the view. Fig. 2 is a front or right-hand view of Fig. 1. Fig. 3 is a plan view of the machine. Fig. 4 is a side view of the twisted bar of the machine which carries and supports the series of blocking blades or cutters and their connections. Fig. 5 is a side view of the twisted bar stripped entirely of the blocking blades or cutters and their connections. Fig. 6 is a sectional end view of the twisted bar and shows the method of holding the blocking blades or cutters thereon. Fig. 7 is a view similar to Fig. 6, but shows the blocking blades or cutters replaced by thinner prongs or teeth. Fig. 8 is a portion of the twisted bar, shown in longitudinal section. Fig. 9 is a side view of the front end of the blocking-machine, drawn on an enlarged scale, and illustrates in dotted lines the vertical movement of the twisted bar and the bed-piece, the blocking blades or cutters being omitted from the former; and Fig. 10 is a plan view of Fig. 9 and shows in dotted lines the horizontal movement which can be given to the twisted bar and the bed-piece as well
as to the cultivator parts when attached to the machine, the blocking blades or cutters of the twisted bar being omitted, as in Fig. 9.

Similar characters of reference refer to similar parts in the several views.

In Figs. 1 and 2 a suitable framework 1 is provided, the sides of which are connected at the front end by the pieces 2 and 3, forming a part of said framework 1. Road-wheels 4 are attached to the ends of a main shaft 5, which is mounted in suitable bearings on said framework 1 and from which motion is derived for the several working parts when the machine is drawn along the ground.

Figure 10:
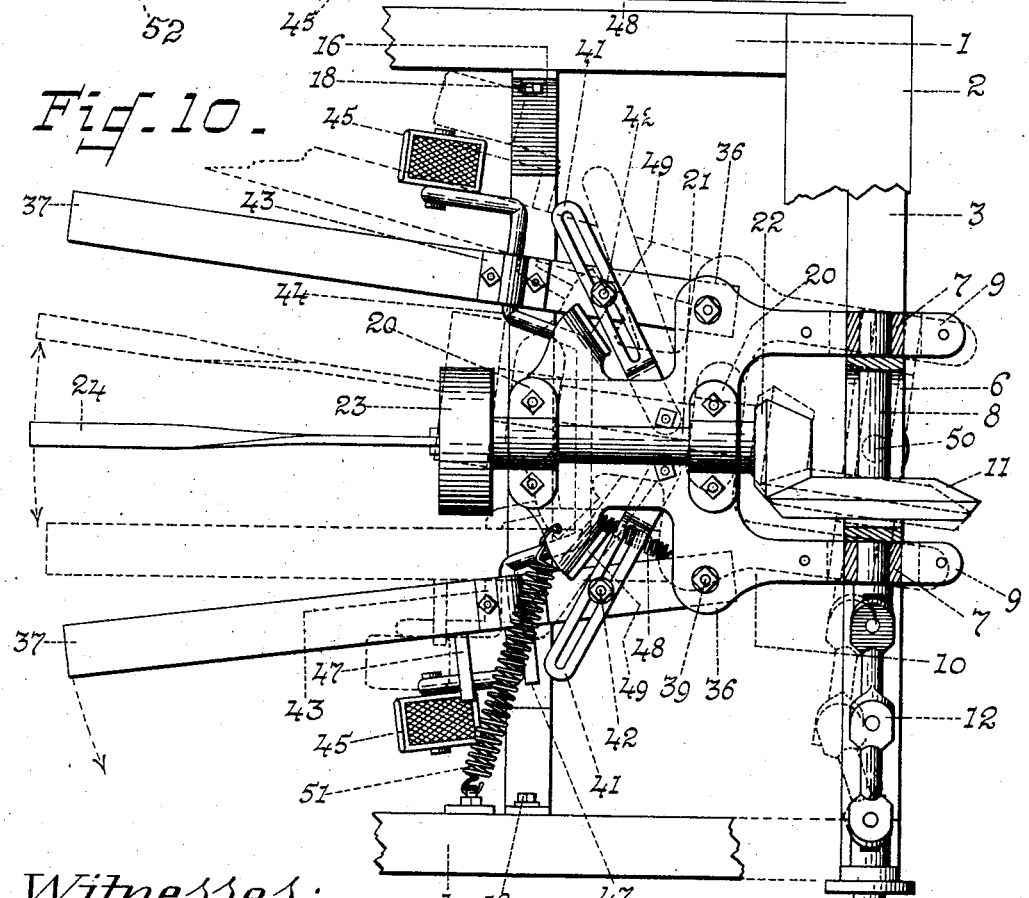

At the front end of the framework 1 and between the pieces 2 and 3 is pivoted a yoke 6, which is preferably located centrally between the sides of the framework and is provided on each outer side with the hubs or bearings 7 and at the top and bottom with pivots 50, as plainly shown in Figs. 9 and 10. Within the hubs or bearings 7 of said yoke 6 is carried a shaft 8, and on the exterior of said hubs or bearings 7 is carried the boxes 9 of the end of the bed-piece 10, the latter being free to move thereon. A beveled driving-gear 11 of suitable size is carried within the pivoted yoke 6 on the shaft 8, which latter is extended to one side of the framework and has a universal joint 12, as shown in Fig. 2.

On the main shaft 5, between one of the road-wheels 4 and the framework 1, is fastened a main driving sprocket-wheel 13, which is connected by a suitable sprocket-chain 14 with a sprocket-wheel 15, which is suitably fastened on and turns the above-mentioned shaft 8, having the beveled driving-gear 11 and the universal joint 12.

The forward end of the bed-piece 10 through the boxed ends 9 is supported on the outside of the hubs or bearings 7 of the yoke 6 and swings thereon, while the rear end is supported on the strap 16, which is passed under it and is fastened at the ends to either side of the framework. The said strap 16 is provided with slots 17 where the ends are fastened to the framework, through which are passed bolts 18, thus rendering the same adjustable. A bearing-space 19 (shown in Fig. 9) is formed on the under side of said bed-piece 10 at the rear end, in which said strap 16 passes. Boxes 20 are provided on the upper side of the bed-piece 10, which support a shaft 21, the forward end of which has a beveled pinion 22, which meshes with the beveled driving-gear 11, and the rear end with the blocker-head 23, on which in a line with the center of said shaft 21 is fastened one end of the twisted bar 24, as plainly shown in Figs. 3 and 4.

The twisted bar 24 has a quarter-twist midway, as seen in Figs. 5 and 9, and is provided with bearings 25, which support pivoted rocking pieces 26. (Shown in Fig. 4.) A concaved clip-piece 27 is bolted on the outer side of each of said rocking pieces 26, and between the two are carried the shanks 28 of the blocking blades or cutters 29. On the opposite side of the twisted bar 24 and conforming to the twist thereof is the extended clip 30, between which and the said twisted bar are held the springs 31, the object of which is to relieve any strain which may be brought to bear on the shanks of the blocking blades or cutters should the latter meet with obstructions in or on the ground while being operated. The said extended clip 30 is held in proper position by shanks provided on the bearings 25, which pass through the twisted bar and said extended clip and are there secured by the nuts 32. The outer end of the said twisted bar is provided with the thinning prongs or teeth 33, the office of which being to loosen the soil around the beets spared to grow to maturity, rendering it easy to weed and arrange them after the machine has performed its work. By referring to Figs. 3 and 7 it will be observed that the shanks of the blocking blades or cutters. which are held between the rocking pieces and the concaved clips already mentioned, are due to the twist of the twisted bar 24, carried in two rows opposing each other in a spiral, thus rendering the action of the blocking blades or cutters easy in their work of cutting away the superfluous growth, and, besides, the cutters being disposed on the bar as described their action during rotation is more evenly balanced and distributed, which action, too, is assisted largely by the weight of the revolving blocker-head 23, to which said twisted bar is fastened.

It will be evident that sets of thinner-prongs 33, as already described, may be substituted for the shanks of the said blocking blades or cutters, thus converting the blocking machine into a thinner and loosener of the earth about the growth, or the thinners and the blocking-blades may alternate with each other upon the same if found desirable under certain conditions of soil and growth.

Referring to Figs. 1 and 2, it will be observed that a tilting lever 34 is shown for raising the bed-piece and all the parts connected therewith from the ground while the machine is being drawn from place to place, although it is not an essential factor in the operation of the machine, at which times the connecting-rod 35 between the lever 34 and the bed-piece 10 is disconnected, so it may not interfere with the manual operation of the several parts hereinafter described.

Referring to Figs. 9 and 10, it will be seen the bed-piece 10 is provided forwardly at either side with flanges 36, at the under side of which are hung the ends of cultivator beams or bars 37 in such a manner as to permit them to be moved horizontally or to be moved up and down without binding. This is effected by the passing of a bolt 38 horizontally through the bar 37 near its end, while the loop of a looped bolt 39 is passed through a slot 40 of said bar and is extended upwardly through the flange 36 and there secured in position by a proper nut, all of which is plainly shown in Fig. 9.

Slotted straps 41 are pivoted on the under side of the bed-piece 10 by a slotted bolt $a$ and from thence extended on the upper side of the said cultivator-bars, on which they are provided with a set-bolt 42 in the slots of the same. By means of this arrangement of parts the said cultivator-bars can be held apart or in a contracted position at the will of the operator.

In suitable boxes 43, provided in proper place on the cultivator-bars 37, is carried the cranked shaft 44, the middle or cranked portion of which passes under and against the bed-piece 10, as plainly seen in Figs. 9 and 10. The outer ends of said cranked shaft 44 are turned properly and provided with treadles 45 on the outer sides of the said cultivator-bars. By this arrangement the bed-piece 10 and all of its connected parts can be raised vertically on the bearings 7 of the yoke 6 by the feet of the operator pressing downwardly on the treadles 45 of said cranked shaft 44 while seated on the seat 46. Stops 47 are provided in proper place on one or both of said cultivator-bars to prevent the cranked shaft from being thrown either too far forward or backward, and a spring 48 between said cranked shaft and some suitable point on the cultivator-beams or on the under side of the bed-piece keeps said cranked shaft in a normal operative position. (See Fig. 9.)

The movement of the several parts above mentioned is indicated by the dotted lines in Fig. 9.

In Figs. 3, 9, and 10 foot-pieces 49 are shown provided at either side of the bed-piece 10, by means of which the said bed-piece and all of its connected parts, inclusive of the cultivator-bars 37 and their connected parts, may be moved laterally to either side, the whole turning on the pivots 50, extended from the top and bottom of the yoke 6, said pivots 50 being plainly shown in Fig. 9, the universal joint 12 of the shaft 8 permitting of the movement without interfering with its rotation when the machine is operated. The lateral movement of the several parts as described is indicated by the dotted lines in Fig. 10 and the direction of the same by the dotted arc and arrow-points.

A spiral spring 51 of sufficient strength is arranged in any suitable position between the bed-piece 10 and the framework of the machine, as seen in Fig. 10, to compensate for the side pull or draft caused by the action of the blocker blades or cutters upon the ground.

A clutch may be provided on the main driving-shaft to engage with a similar clutch provided on a main driving sprocket-wheel turning on said main shaft to be thrown in and out of engagement by a convenient hand-lever, so that the several working parts may be non-operative or operative when desired; but as this feature is well known and in common use on machines of this class it has been deemed unnecessary to show the same.

The cultivator-bars 37 are provided with suitable cultivator-shares 52. It will also be observed that I have shown no means on the machine for the attachment of a pole or otherwise by which the same may be drawn over the ground, it, too, being deemed non-essential, as any form of the same answering the purpose can be applied.

In the operation of my machine the same is drawn astride the row of growth, and as the road-wheels turn the main shaft is revolved, rotating with it the main sprocket-wheel 13, which through its sprocket-chain connection with the smaller sprocket-wheel 15 causes it to turn and with it the shaft 8 having the universal joint 12 and the beveled driving-gear 11. In this connection it may be proper to mention that whenever a change of speed is desired the smaller sprocket-wheel can be removed and another of desired size substituted therefor, the slack of the sprocket-chain being taken up or released by an ordinary tightener-pulley, (shown at 53 in Figs. 1, 2, and 3.) The beveled driving-gear 11 engaging with the beveled pinion 22 on the shaft 21, carried on the bed-piece 10, causes said shaft 21 to turn and with it the blocker-head 23. Said blocker-head having secured to its outer side the twisted bar 24, provided with blocking-blades and thinning-prongs, as already described, the whole rotates, and as the blocking-blades reach the ground they cut out the growth of beet-tops, leaving a few at regular intervals for cultivation, through which the thinning-prongs pass, loosening the earth about them and rendering them easy of subsequent manipulation and adjustment, which necessarily follows. Should the revolving blocker-blades or thinning-prongs meet any obstruction in the form of hard ground or stones, the blow they receive is mitigated by the springs on the bar impinging on their several shanks. In this manner it will be seen much handwork, hoeing, cutting, and the like labor is avoided. When it is found desirable to cultivate the rows at the same time that they are blocked, the cultivator-bars and their connected parts are arranged on the machine as I have already described, and the two operations of blocking out and cultivating the rows are performed at one and the same operation. As the machine progresses in the work certain contingencies are sure to arise which render it desirable to raise or lower the twisted bar carrying the blocking-blades and thinning-prongs and for swinging the same and the cultivator-bars from one side to the other of the course of progress. The former operation is readily effected by the driver in his seat operating the cranked shaft with his feet on its connected treadles, as I have described. The latter operation is accomplished by the feet of the driver resting and pushing to the right or left upon the foot-pieces 49 of the bed-piece 10, when the said bed-piece and all its connected parts swing on the pivots 50 at the top and bottom of the yoke 6, the universal joint 12 of the shaft 8 accommodating itself to the lateral movement.

Having thus described my invention and its operation, what I claim as new, and desire to secure by Letters Patent of the United States, is—

1. In a beet-blocking machine a twisted bar carrying blocking-blades and thinning-prongs arranged oppositely and spirally thereon and carried centrally on the blocker-head of a shaft on a bed-piece having foot-pieces and hung forwardly on the side bearings or hubs of a vertically-pivoted yoke carrying a shaft having a universal joint and carried rearwardly on an adjustable strap, and cultivator-beams pivoted on said bed-piece and having a cranked shaft provided with treadles at either end and stops on either side thereof substantially constructed in the manner and for the purpose herein described and shown.

2. In a beet-blocking machine a twisted bar having the bearings 25, and centrally attached on the blocker-head 23, combined with the rocking pieces 26, the concaved clip-pieces 27, the blocking-blades 29, and the thinning-prongs 33, arranged oppositely and spirally thereon between said rocking pieces and said concaved clips, and the twisted extended clip 30, and the springs 31, between said twisted extended clip 30, and said twisted bar, substantially in the manner and for the purpose herein shown and described.

3. In a beet-blocking machine the bed-piece 10, having foot-pieces 49, flanges 36, a bearing-space 19 on the under side, boxes 20, supporting the shaft 21, having at one end the blocker-head 23, and at the other end the beveled pinion 22, and boxes 9, at the forward end of said bed-piece, a spring 51, between it and the framework 1, and the slotted straps 41, pivoted beneath by a slotted or looped bolt *a*, combined with the yoke 6, having the hubs 7, and the top and bottom pivots 50, and carrying the shaft 8, having the beveled driving-gear 11, and the universal joint 12, and a sprocket-wheel 15, connected with the main driving sprocket-wheel 13, on the main shaft 5, by a sprocket-chain 14, substantially in the manner and for the purpose herein described and shown.

4. In a beet-blocking machine the bed-piece 10, having foot-pieces 49, a bearing-space 19, flanges 36, and boxes 20, supporting the shaft 21, and boxes 9, on the hubs 7, of the yoke 6, the spring 51, between it and the framework 1, and the slotted straps 41, pivoted beneath by the looped bolt *a*, combined with the cultivator-bars 37, pivoted to said flanges 36, by the looped bolt 39, and the cross-bolt 38, and having a cranked shaft 44, provided with treadles 45, and the stops 47, for said cranked shaft, and a spring 48, between one of said cultivator-bars and said cranked shaft, and shares arranged on each substantially constructed in the manner and for the purpose herein specified and shown.

5. In a beet-blocking machine the combination of the twisted bar 24, having the bearings 25, the rocking pieces 26, the concaved clip-pieces 27, the blocking-blades 29, the thinning-prongs 33, arranged spirally and oppositely thereon between said rocking pieces and said concaved clips, and the twisted extended clip 30, and the springs 31, between said twisted extended clip 30, and said twisted bar; with the bed-piece 10, having foot-pieces 49, flanges 36, a bearing-space 19, on the under side, boxes 20, supporting the shaft 21, having at one end the blocker-head 23, to which one end of said twisted bar 24, is centrally secured, and at the other end the beveled pinion 22, and boxes 9, at the forward end of said bed-piece, a spring 51, between it and the framework 1, and the slotted straps 41, pivoted beneath by a looped bolt *a;* the yoke 6, having hubs 7, on the outer side of which said boxes 9, of said bed-piece 10, are adapted to turn, and the top and bottom pivots 50, and carrying the shaft 8, within said hubs 7, said shaft having the beveled driving-gear 11, and the universal joint 12, and a sprocket-wheel 15, connected with the main driving sprocket-wheel 13, on the main shaft 5, by a sprocket-chain 14; the adjustable supporting-strap 16, at the rear end of said bed-piece; and the cultivator-bars 37, pivoted to said flanges 36, by a looped bolt 39, and a cross-bolt 38, and having a cranked shaft 44, provided with treadles 45, and the stops 47, for said cranked shaft, and a spring 48, between one of said cultivator-bars and said cranked shaft, and shares arranged on each substantially constructed and arranged in the manner and for the purpose herein described and shown.

In testimony whereof I have signed my name, at Auburn, Cayuga county, New York, this 30th day of July, A. D. 1904, in the presence of two subscribing witnesses.

ERNEST JOHN YOUNG.

Witnesses:
FRANK R. RATHBUN,
HENRY T. KEELER.